Patented Aug. 10, 1926.

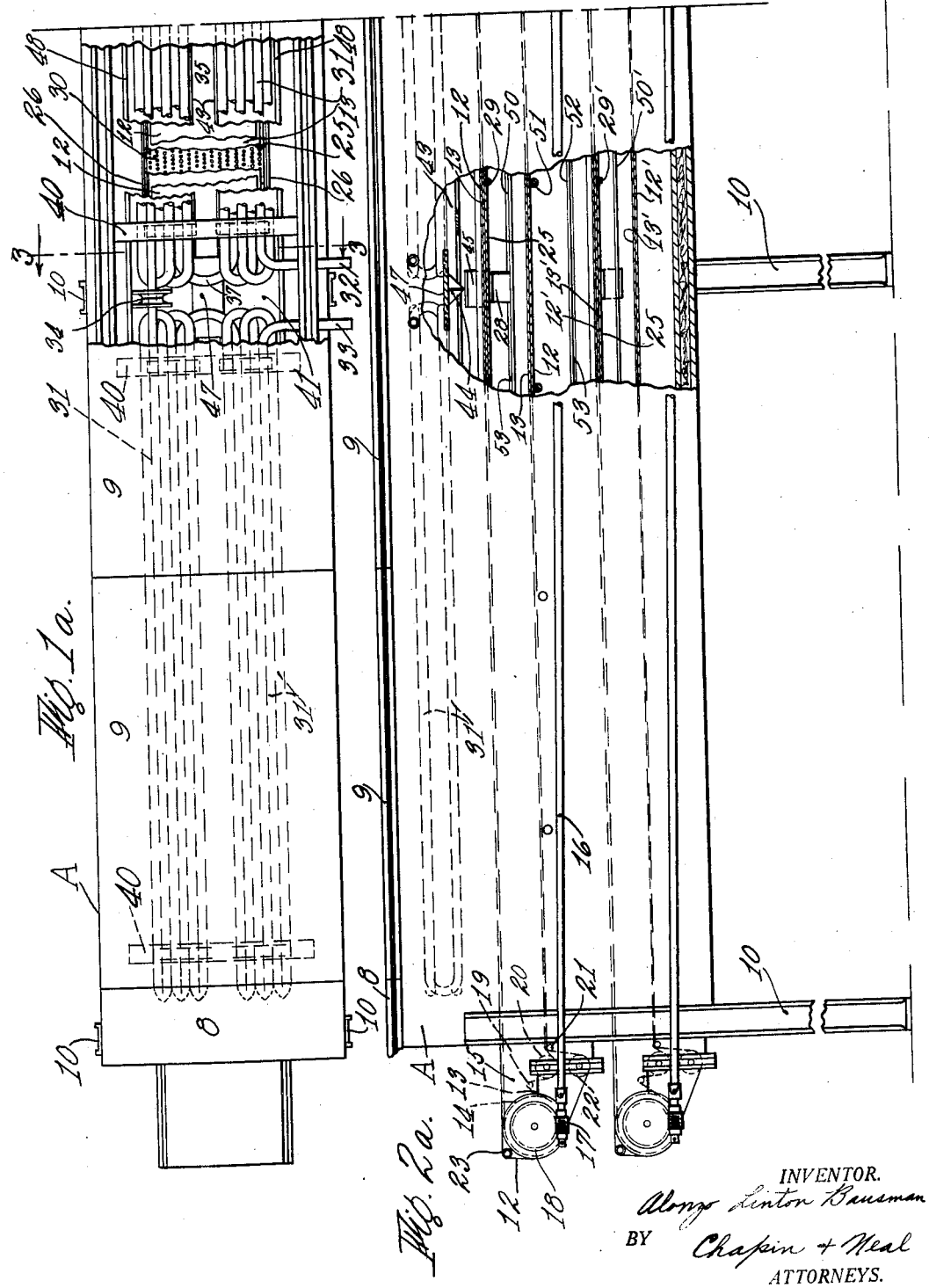

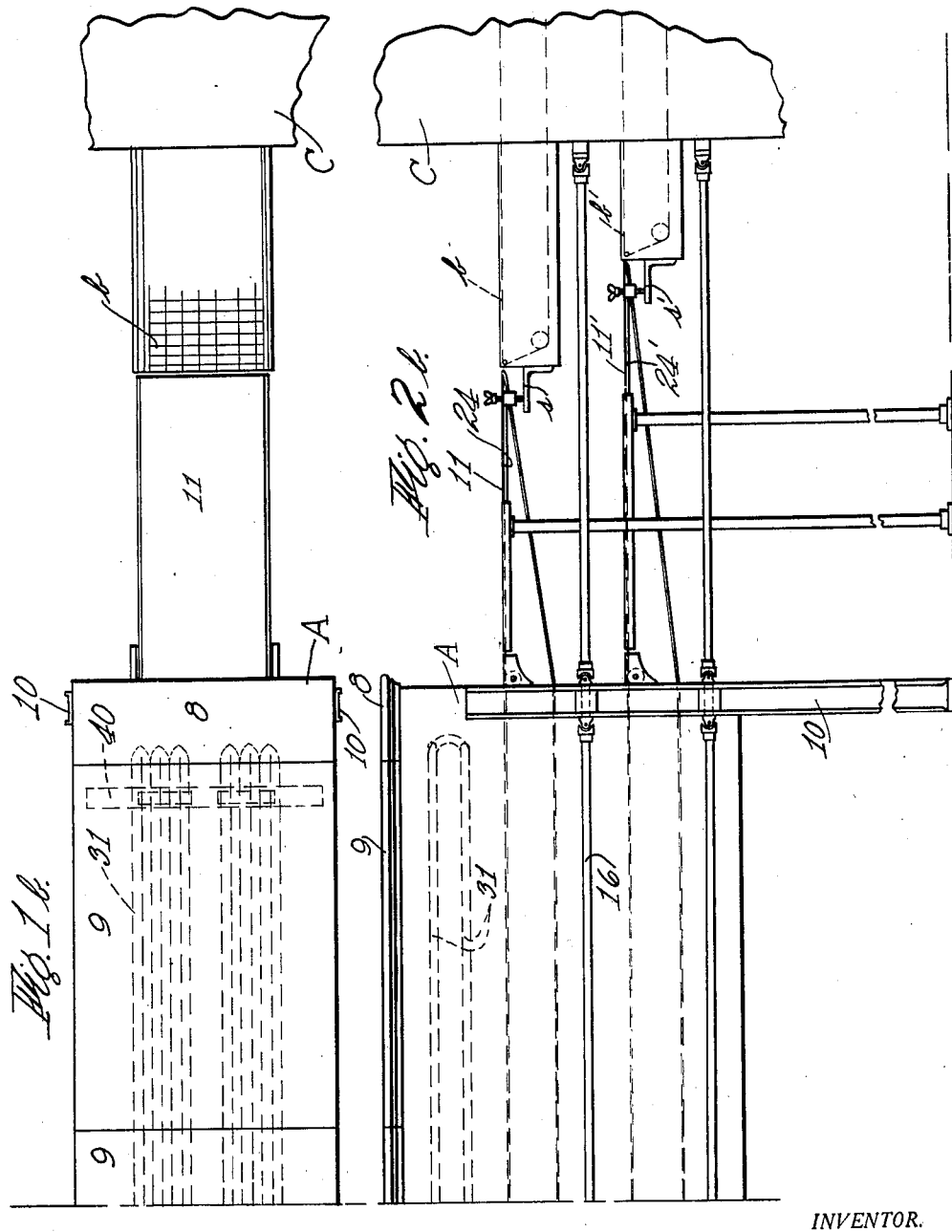

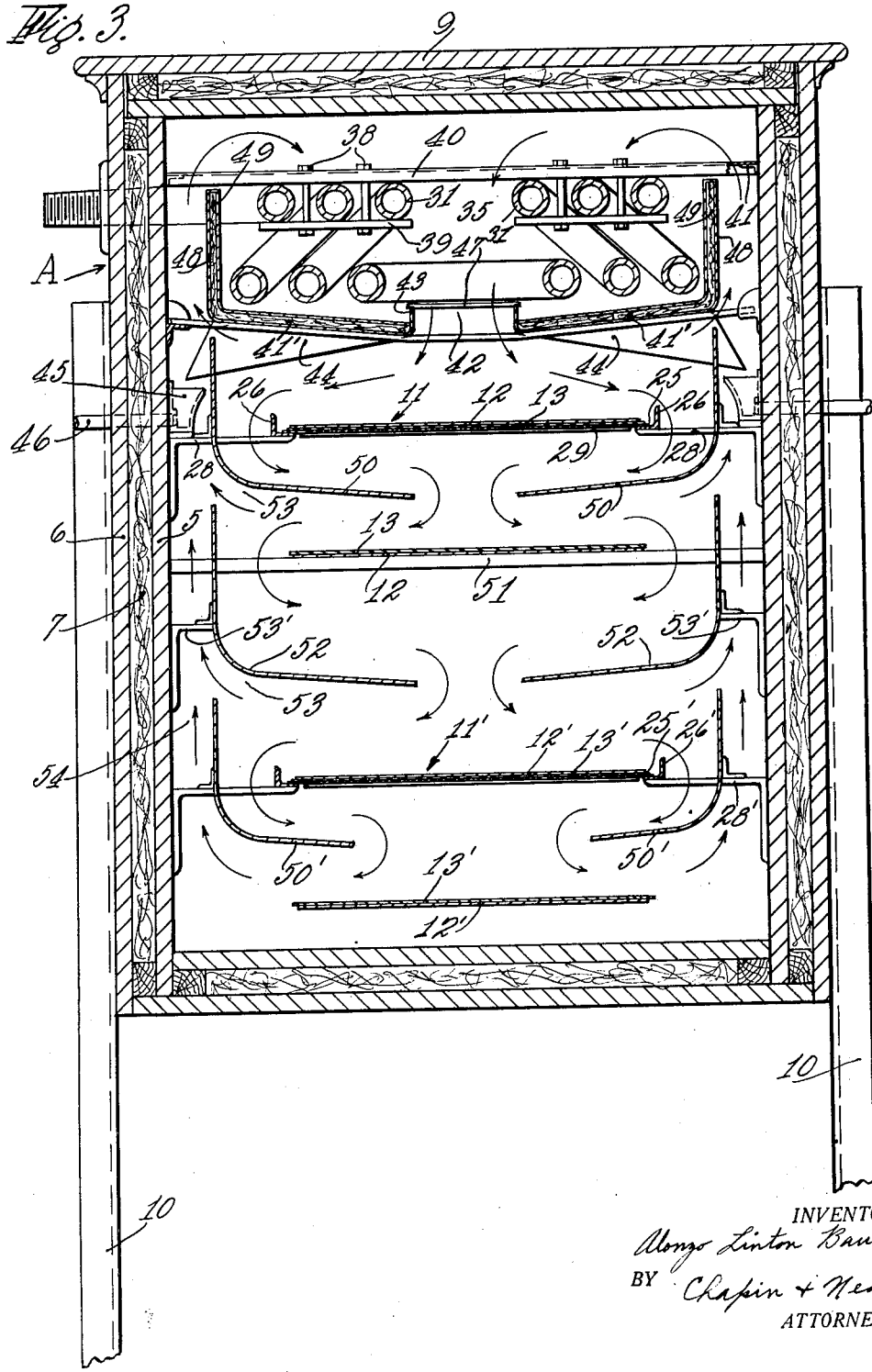

1,595,443

UNITED STATES PATENT OFFICE.

ALONZO LINTON BAUSMAN, OF SPRINGFIELD, MASSACHUSETTS, ASSIGNOR TO NATIONAL EQUIPMENT COMPANY, OF SPRINGFIELD, MASSACHUSETTS, A CORPORATION OF MASSACHUSETTS.

CONFECTION-COOLING APPARATUS.

Application filed June 11, 1925. Serial No. 36,394.

This invention relates to improvements in confection cooling apparatus.

The invention, in common with others of the prior art, makes use of a box or casing through which the confections to be cooled are carried by a suitable conveyer, usually directly from the delivery end of a chocolate coating machine. The confections, during their travel through the casing, are cooled by being subjected to chilled air. The use of air, as a confection cooling means, is old. To get effective chilling, the air must perforce circulate and, in the prior art, this circulation has generally been effected by mechanical means, such as fans, which set up a forced circulation. Forced circulations of air in confection cooling apparatus have the disadvantage of tending to mar the appearance of the coated confections by forming wrinkles in the freshly applied coatings before they are chilled, as on their entrance into the casing. This invention, among other things, seeks to avoid the use of forced circulation and to provide in its place a more gentle, but nevertheless effective, circulation of air, as in a thermo-siphon manner. While thermo-siphonic circulation is, of course, broadly old, its application to a confection cooling apparatus requires to be effected in a particular way in order to get satisfactory results. The simplicity of the thermo-siphon circulating system makes it especially desirable but prior art attempts to use this sort of circulation have not generally been successful wherefore the forced air circulation has generally been resorted to.

This invention is characterized by a particular relationship between the air cooling means and the confection conveyer, whereby the cooled air is not only circulated in thermo-siphon fashion but more especially, is caused to follow a certain path which will cause the confections to be cooled effectively and with substantial uniformity.

The invention is carried out by a series of baffles to direct the cooled air first to those confections which are at or near the center of the conveyer and which are the hardest to cool, and to then divide the cool air into two streams, which travel crosswise of the conveyer in opposite directions toward its side edges, whereby as the air becomes warmer as it approaches the side edges of the conveyer it encounters confections which become progressively easier to cool by reason of their proximity to such edges. The result is a cooling of the confections with substantial uniformity regardless of their transverse location on the conveyer. The two streams of air are then caused to travel downwardly in under the confection carrying stretch of the conveyer to cool the bottoms of the confections and to pass toward each other until they meet, whereupon the streams of air may be permitted to return to the cooling means.

Another feature of the invention is the provision of a single cooling box and single cooling means to receive a plurality of confection conveyers and to provide baffles, whereby the air is caused to weave in and out between the laps of the conveyers,— provision being made to separate from the air streams which travel in and out but generally downwardly, those portions of the streams which have become warmed by contact with the confections, thereby keeping the downwardly moving air as cool as possible for the confection cooling function.

The invention will be disclosed with reference to the accompanying drawings, in which:—

Figs. 1ª and 1ᵇ, when joined together along the vertical dot-dash lines, afford a complete plan view of an apparatus embodying my invention;

Figs. 2ª and 2ᵇ, when similarly joined together, afford an elevational view of the same; and Fig. 3 is a cross-sectional view of the apparatus taken on the line 3—3 of Fig. 1ª.

Referring to these drawings: The apparatus includes a suitable casing A, through which the confections to be cooled travel in a longitudinal direction. This casing is preferably provided with inner and outer walls 5 and 6, respectively, which are spaced one from the other and receive insulating material 7 therebetween. Casing A has at each end two fixed cover sections 8, of similar construction, and intermediate these sections are a plurality of removable cover sections 9 of similar construction, which are mounted in abutting relation with the end sections 8 to afford a complete top enclosure for casing A. The casing is otherwise completely enclosed except for certain openings in its end walls which permit the entrance and exit of a conveyer to be described. The casing A is suitably supported, as by a plurality of legs 10, at the proper level above the floor.

The confections, to be cooled, are usually delivered from a belt, such as $b$, of a confectionery coating machine, a portion of which is indicated conventionally in Figs. 1[b] and 2[b] at C. These confections are automatically delivered by belt $b$ upon a conveyer 11, which passes longitudinally through the casing A and carries the candies in its upper or working stretch of travel. Conveyer 11 is a composite one and consists of an outer, confection-carrying belt 12 of suitable material, such as oil cloth, waxed paper or the like, and an inner or driving belt 13, usually of convas. These belts are driven by a roll 14 mounted in a frame 15 supported at one end of casing A,—such roll being driven from a shaft 16 by a worm 17 and worm gear 18. The belt 13 is caused to travel around a substantial part of the periphery or roll 14 by reason of a guide roll 19. A tension roll 20, guided in frame 15 for vertical movement, is arranged between roll 19 and a similar guide roll 21. A similar tension roll 22 operates on belt 12 between roll 14 and guide roll 21. A guide roll 23 is provided to cause belt 12 to make a comparatively sharp turn at the end of its upper stretch of travel, rather than allowing it to travel in the normal course around roll 14 as does belt 13. At the other end of the casing A, a table 24 is provided which is pivoted at one end to casing A and at the other end is supported on a shelf $s$ of the coating machine C. Both belts travel over this supporting table which, at its end, has a comparatively thin edge to cause the belts to make sharp turns as they pass from their lower to their upper stretches of travel.

The belts 12 and 13 are prevented from sagging during their upper and working stretch of travel, by being supported on a table which is preferably of thin and good heat conducting material and preferably also of a foraminous nature. As shown, this table is made up of a plurality of removable thin metal plates 25, which are mounted end to end in abutting relation and are supported along their side edges by resting on two parallel, longitudinally disposed, and laterally spaced angle irons 26. The latter are secured to a series of angle iron brackets 28 fixed at longitudinally spaced intervals to the inner side walls of casing A. The side edges of the plates 25 are thus spaced from the adjacent side walls of casing A so that air from the region above the plates can pass to the region therebelow. Each plate 25 desirably has downturned ends 29 (Fig. 2[a]) as the otherwise sharp edge might abrade belt 13. Each plate is likewise provided with a plurality of holes 30 (Fig. 1[a]) passing entirely therethrough,—the idea being to allow air to more readily reach the confection supporting and driving belts. As much of the plate should be cut away as possible without impairing its strength as a support for the belts.

The passage of cold air from the region below plates 25 through the openings 30 aids very materially in rapidly cooling the bottoms of the confections, which bottoms rest on belt 12.

The air cooling system involves a conduit through which a suitable cooling medium may be circulated. As shown, this conduit consists of a pipe coil 31 which has an inlet 32 and an outlet 33 and is made for convenience, in two sections joined at 34 at or near the center of casing A. Each section is likewise subdivided as shown in Fig. 3 so that there is a central free space 35 between the two lateral subdivisions of the coil. The brine enters at 32 and travels back and forth from the center to one end of casing A over one lateral section thereof. It then crosses over, as at 37, to the other lateral section, and travels back and forth from the center to the same end of casing A after which it passes through the connection 34 and travels back and forth from the center to the opposite end of casing A traversing first one lateral section thereof and then the other, finally emerging at 33.

The pipe coil 31 is supported at intervals along its length by bolts 38 and straps 39 from cross bars 40 made up of inverted channel irons, the ends of which rest upon angle iron brackets 41 secured to the side walls of casing A. Underlying each lateral section of coil 31 and extending from end to end of casing A is a combined baffle and trough member 41' and these two members extend laterally toward each other in downwardly inclined relation terminating near the center of the casing in spaced relation leaving a vertical passage 42 disposed beneath the space 35 above described. Secured to the adjacent edges of baffles 41' are upstanding parts 43 which cooperate with the parts 41' to form troughs to collect any drip from the overlying portion of coil 31. At the center of the casing A each trough delivers into an outwardly sloping trough 44 which conducts the drip to a receptacle 45 having an outlet pipe 46 leading out of the casing. Where the coil crosses over the passage 42 from one side of the casing to the other (in two places near the center as shown in Fig. 1[a]), a plate 47 is applied across the two upstanding pieces 43 to prevent the drip falling onto the confection conveyer. The outer edge of each baffle 41' terminates in spaced relation with the adjacent side wall of casing A and with an upward extension 48 which terminates at a level about that of the highest point of coil 31 and at any rate at a level above that of the inner upstanding parts 43. This arrangement starts a thermosiphon circulation of air, the colder air passing downward through the central passage 42 and the warmer air returning in the passages formed between the parts 48 and the outer walls of casing A. The parts 41′ and 48 are preferably of double wall construction and the space between the walls is filled with insulating material 49.

The arrangement, above described, starts the circulation of air and causes the coldest air which passes downwardly through passage 42 to first cool the confections at and near the center of the confection conveyer 11. The air is then forced by the latter to spread horizontally outwardly and divides into two streams which move crosswise of the conveyer and in opposite directions toward the side edges of the conveyer, thereby successively engaging all the confections. The confections near the side edges of the conveyer are the easiest to cool and those in the center are hardest to cool. Therefore, substantial uniformity of cooling is secured by having the coldest air first engage the confections which are hardest to cool and then encounter the confections which are progressively easier to cool.

The top and side coatings are adequately cooled by the arrangement described and, of course, the bottom coatings are also cooled to some extent. The bottom coatings naturally present the most difficult problem, as far as cooling is concerned, and hence the provision of the perforated plates 25 which allow air to pass upwardly through them and facilitate a heat exchange through the conveyers. But this, in itself, is not enough and it is desired to make the cold air travel along the underside of the plates, rather than straight downwardly. For this purpose, baffles 50 are provided, one on each side of the casing, which extend longitudinally from end to end thereof. Each baffle has a vertical portion which lies between a side edge of conveyer 11 and the adjacent side wall of casing A, extending upwardly toward but terminating in spaced relation with the baffle 48, thereby leaving a space through which the warmer portions of the air stream can move upwardly and return to the cooling means. This vertical part of baffle 50 is secured at intervals to angle irons 28 and it serves to partition the space between each side edge of conveyer 11 and the adjacent side wall of casing A so that an outer vertical passage for warmer air is formed. These baffles 50 are turned downwardly and inwardly and extend toward one another, preferably with a slight downward inclination to stimulate air flow in the direction desired. They terminate in spaced relation, leaving a central passage between them for the escape of air.

It may sometimes be desired to have the casing A receive more than one confection conveyer and I have illustrated such an arrangement. This second conveyer, marked 11′, is similar in construction and is mounted in a similar manner to that already described. Parts associated with conveyer 11′ in any way are marked with the same reference numerals used to designate the corresponding parts associated with conveyer 11, except that the numerals are primed. In the apparatus illustrated, the return lap of conveyer 11 is supported, if need be, by a series of cross rods 51. Baffles 50′ are associated with conveyer 11′, in the same way as the baffles 50, and function in the same manner. The downwardly travelling colder air is turned by the lower lap of conveyer 11 and split into two oppositely travelling streams which after they pass the side edges of conveyer 11 are turned by baffles 52 disposed intermediate the baffles 50 and 50′. The baffles 52, which are supported by a series of angle irons 53′ from the side walls of casing A, are identical in construction with baffles 50. A space is left, however, between the uppermost edge of baffle 52 and the adjacent part of baffle 50 and a similar space is left between the uppermost edge of baffle 50′ and the adjacent part of baffle 52. These spaces 53 allow the warmer portions of the air stream to separate from the colder portions and return to the cooling means by way of the outer vertical channels 54 in which the air current moves upwardly.

The operation with respect to conveyer 11 has been sufficiently described and the operation with respect to conveyer 11′ is similar except that the colder portions of the air, as delivered through the central vertical channel between baffles 50, are caused by baffles 52 to flow around the lower lap of conveyer 11 and be delivered to the central portion of the upper lap of conveyer 11′.

The invention has been disclosed herein, in an embodiment at present preferred, for illustrative purposes but the scope of the invention is defined by the appended claims rather than by the foregoing description.

What I claim is:

1. A confection cooling apparatus, comprising, a casing, a confection conveyer mounted to travel longitudinally therethrough with its side edges spaced from the adjacent walls of said casing and a series of baffles extending longitudinally of the casing and disposed above, below and along the sides of the conveyer, there being a central inlet passage formed between the upper baffles and a similar outlet passage between the lower baffles, air cooling means communicating with said central inlet passage, the side baffles partitioning the space between each side edge of the conveyer and the adjacent side wall of said casing and forming between them and said side walls return passages leading to said air cooling means for the upward travel of the warmer air.

2. A confection cooling apparatus, comprising, a casing, a confection conveyer mounted to travel longitudinally therethrough with its side edges spaced from the adjacent walls of said casing and a series of baffles extending longitudinally of the casing and disposed above, below and along the sides of the conveyer, there being a central inlet passage formed between the upper baffles and a similar outlet passage between the lower baffles, air cooling means communicating with said central inlet passage, the side baffles partitioning the space between each side edge of the conveyer and the adjacent side wall of said casing and forming between them and said side walls return passages leading to said air cooling means for the upward travel of the warmer air and passages between the upper portions of the side baffles and the outer edges of the upper baffles to permit warmer portions of the air to pass into said return passages.

3. A confection cooling apparatus, comprising, a casing, a confection conveyer mounted to travel longitudinally therethrough with its side edges spaced from the side walls of said casing, cooling means disposed above the conveyer in said casing, longitudinally disposed baffle plates mounted in laterally spaced relation in said casing below said means and above said conveyer with their outer edges spaced from the adjacent side walls of said casing and at a higher level than their inner and adjacent edges, longitudinally disposed baffles mounted in laterally spaced relation below said conveyer and having their outer edges extending upwardly above the conveyer and between the side edges thereof and the side walls of said casing.

4. A confection cooling apparatus, comprising, a casing, a plurality of confection conveyers mounted one above the other for travel longitudinally of said casing and with their side edges spaced from the side walls of said casing, cooling means in the casing above the conveyer, baffles associated therewith to induce a thermo-siphon circulation of air moving downwardly to the center of the upper lap of the upper conveyer and spreading toward its side edges, other baffles to turn the air stream inwardly below said upper lap and deliver it centrally upon the lower lap of the upper conveyer, similar baffles to turn the air stream in under said lower lap and deliver it centrally upon the upper lap of the conveyer therebelow, all said baffles having their outer edges at a higher level than their inner edges and extending upwardly between the side edges of said conveyers and the adjacent side walls of the casing to form between them and said walls passages in which the warmer air travels upwardly and returns to said cooling means.

In testimony whereof I have affixed my signature.

ALONZO LINTON BAUSMAN.